(12) United States Patent
Vinkenvleugel

(10) Patent No.: US 8,816,611 B2
(45) Date of Patent: Aug. 26, 2014

(54) BUTTON BASED COLOR NAVIGATION METHOD AND DEVICE IN A LIGHTING OR VISUALIZATION SYSTEM

(75) Inventor: Lucius Theodorus Vinkenvleugel, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1318 days.

(21) Appl. No.: 12/599,351

(22) PCT Filed: May 9, 2008

(86) PCT No.: PCT/IB2008/051840
§ 371 (c)(1),
(2), (4) Date: Nov. 9, 2009

(87) PCT Pub. No.: WO2008/142601
PCT Pub. Date: Nov. 27, 2008

(65) Prior Publication Data
US 2010/0301780 A1 Dec. 2, 2010

(30) Foreign Application Priority Data
May 16, 2007 (EP) .................................. 07108344

(51) Int. Cl.
*H05B 37/02* (2006.01)
(52) U.S. Cl.
USPC ........................................................ 315/362
(58) Field of Classification Search
CPC ........... H05B 33/0842; H05B 33/0863; H05B 33/0866; H05B 37/02
USPC ........................................................ 315/362
See application file for complete search history.

(56) References Cited

U.S. PATENT DOCUMENTS

| 4,914,624 A | 4/1990 | Dunthorn |
| 5,329,431 A * | 7/1994 | Taylor et al. ..................... 362/85 |
| 2005/0040772 A1 * | 2/2005 | Guzman et al. ............... 315/291 |
| 2006/0098430 A1 | 5/2006 | Chang et al. |

(Continued)

FOREIGN PATENT DOCUMENTS

| EP | 1528785 A1 | 5/2005 |
| EP | 1544718 A1 | 6/2005 |
| WO | 9220024 A1 | 11/1992 |

(Continued)

OTHER PUBLICATIONS

Steven Drucker et al., SmartSkip: Consumer level browsing and skipping of digital video content, Apr. 25, 2002, CHI 2002: changing the world, changing ourselves; Technology to help people find information, p. 219-226.*

*Primary Examiner* — Jason M Crawford
*Assistant Examiner* — Christine Johnson
(74) *Attorney, Agent, or Firm* — Yuliya Mathis

(57) ABSTRACT

The invention relates to button based color navigation in a lighting or visualization system, particularly for allowing fast and slow navigation through the colors in a lighting or visualization system only by usage of buttons. For the navigation, a device (10; 50) is provided which comprises several buttons (14,16, 18, 20, 22, 24,- 52, 54) arranged in predetermined order (12,-56), wherein each of the buttons is provided for a certain color of the system to be selected. Presses of one or more buttons (S10) are sensed, parameters of the sensed presses (S12) are evaluated, and a color in the system is changed depending on the evaluation of the parameters (S14, S16, S18, S20).

13 Claims, 5 Drawing Sheets

(56) References Cited

U.S. PATENT DOCUMENTS

2006/0290710 A1  12/2006  Zwanenburg
2007/0171483 A1*  7/2007  Oettinger et al. ............. 358/474
2007/0230159 A1*  10/2007  Cortenraad et al. ............ 362/85
2008/0259590 A1*  10/2008  De Goederen-Oei ........... 362/85

FOREIGN PATENT DOCUMENTS

| WO | 03015067 A1 | 2/2003 |
| WO | 2005080864 A1 | 9/2005 |
| WO | 2005124526 A2 | 12/2005 |
| WO | 2006048916 A1 | 5/2006 |

* cited by examiner

BUTTON BASED COLOR NAVIGATION METHOD AND DEVICE IN A LIGHTING OR VISUALIZATION SYSTEM

The invention relates to button based color navigation in a lighting or visualization system, particularly for allowing fast and slow navigation through the colors in lighting or visualization systems only by usage of buttons.

In order to allow users to create their preferred lighting atmosphere or the colors of visualization system, many modern lighting or visualization systems allow adjusting not only the intensity, but also the color. For inputting a color selection into such systems, color wheels or pads may be used. It is also known to input color adjustment data by means of a touch key. The touch key allows a user to select the preferred hue and saturation by a single touch. However, a touch- or even display-screen-based color navigation is costly. WO 03/015067 A1 discloses a LED light apparatus with instantly adjustable color and intensity. A control panel of the apparatus includes pre-set buttons each corresponding to a pre-set color. The pre-set buttons may be implemented for example by a membrane switch. This allows to quickly selecting a certain color by pressing a single button.

It is an object of the present invention to provide an improved color navigation method and device in a lighting or visualization system.

The object is achieved by the independent claim(s). Further embodiments are shown by the dependent claim(s).

A basic idea of the invention is to combine a fast color navigation with a limited number of buttons with fine-tune possibilities. According to the invention, the fine-tune possibilities may be implemented by sensing presses of one or more buttons and evaluating parameters of the sensed presses with a specific algorithm for changing a color in a lighting or visualization system depending on the evaluation of the parameters. The algorithmic evaluation of parameters of the sensed button presses enable navigation through the colors in the system with a similar functionality like a navigating with a color wheel or touch pad. The inventive color navigation may be implemented at lower costs and technical expenditures than touch- or display-screen-based color navigation, since no expensive touch pad or color wheel is required for navigation. Embodiments of the invention also allow a fast and slow navigation, wherein the slow navigation offers the possibility of fine tuning of colors as will be described later. The invention may be applied to a lighting or visualization system. A lighting system is for example an ambience lighting system. A visualization system is for example a display screen such as a color TV set, computer monitor, a digital photo frame for displaying pictures or a color printer or copier or photo printer for printing color pictures or color photos. In principle, the invention may be applied to any system which generates colors in any way According to an embodiment of the invention, a button based color navigation method in a lighting or visualization system with a device comprising several buttons arranged in predetermined order is provided, wherein each of the buttons is provided for a certain color of the system to be selected, wherein the method comprises sensing presses of one or more buttons,
evaluating parameters of the sensed presses and
changing a color in the system depending on the evaluation of the parameters.

The method may be implemented as algorithm performed in soft- or hardware. For example the method may be stored as computer program in the memory of a microcontroller which is implemented in a color navigation device with buttons such as a remote control for a lighting system or display screen as visualization system.

According to a further embodiment of the invention, the step of evaluating parameters of the sensed presses comprises evaluating the adjacency of two consecutively pressed buttons and
changing the color depending on the evaluated adjacency.

The step of changing the color depending on the evaluated adjacency may comprise according to an embodiment of the invention changing the color fast if the evaluated adjacency is larger than a predetermined adjacency, or
changing the color slowly if the evaluated adjacency is smaller than or equals the predetermined adjacency.

Adjacency particularly means the distance of the position of two buttons on a panel with the buttons or on a remote control. For example, if all buttons are arranged on a kind of color navigation circle, the adjacency may mean the circular distance or angle between two consecutively pressed buttons. The principle of the predetermined adjacency is explained by a simple example in the following: the predetermined adjacency may be set to one button. Thus, if a first button is pressed and the secondly pressed buttons is located immediately besides the firstly pressed button, the evaluated adjacency is one button and, thus, not larger than the predetermined adjacency. Therefore, the selected color is changed slowly, which allows fine-tuning the selected color. However, if one or more buttons are located between the second button and the firstly pressed button, the evaluated adjacency is more than one button and larger than the predetermined adjacency of one button. In this case, the method initiates a fast color changing. This allows to implement a color fine-tune possibility at relatively low costs compared to technically more costly solutions employing color wheels or touch pads.

According to a further embodiment of the invention, the step of changing the color slowly may comprise slowly changing the color as long a button is pressed and
stop slowly changing the color upon release of a button.

This means that the slow color changing mode is preformed by the method as long as the button is pressed and stopped with releasing the pressed button. This allows a user to comfortably fine-tune a color change.

According to a further embodiment of the invention, the step of evaluating parameters of the sensed presses may comprise evaluating the number of presses of a single button and
changing the color depending on the evaluated number of presses.

The step of changing the color depending on the evaluated number of presses may comprise according to an embodiment of the invention changing the color fast if the single button was pressed repeatedly within a predetermined time span or
changing the color slowly if the single button was pressed once within the predetermined time span.

The predetermined time span may be for example a few seconds such as 1 or 2 seconds. The evaluation step then may evaluate whether the single button is pressed twice or three or more times during this time span, or whether the single button was only pressed once during this time span. This embodiment of the method may be implemented at relatively low costs and with moderate technical expenditures.

According to a further embodiment of the invention, the step of evaluating parameters of the sensed presses may also comprise evaluating the time duration of pressing of a single button and changing the color depending on the evaluated time duration.

With this embodiment, the color change in the system may be controlled depending on how long a button is pressed by a user. In other words, a user may determine the color change by pressing a button long or only short. For example, if a user presses a red color button very short, the system may quickly switch to the red color. However, if the user presses the red button for more than one second, the system may slowly change the present color to the red color.

The step of changing the color depending on the evaluated time duration may comprise according to an embodiment of the invention changing the color fast if the evaluated time duration is smaller than a predetermined time duration or changing the color slowly if the evaluated time duration is larger than or equals the predetermined time duration.

Simply said, pressing a button shortly means fast color change and pressing a button long means slow color change. It should be noted that the method could be also implemented the other way round, i.e. pressing a button short means a slow color change and pressing the button long means a fast color change.

According of a further embodiment of the invention, the step of evaluating parameters of the sensed presses may comprise evaluating the simultaneous pressing of several buttons and changing the color depending on the evaluated simultaneous pressing.

According to this embodiment, the color change "mode" may be controlled by pressing several buttons simultaneously. For example, the method could be implemented in that when a user presses a yellow and red button at the same time, the system may slowly adjust the present color to the red color. And when a user presses only the red button, the system could quickly adjust the present color to the red color.

The step of changing the color depending on the evaluated simultaneous pressing may comprise according to an embodiment of the invention changing the color slowly if two or more buttons were pressed at the same time or changing the color fast if only one button was pressed.

According to an embodiment of the invention, the step of sensing presses may comprise storing an identification of a pressed button and the number of consecutively presses of the button within a predetermined time span in a memory. According to a yet further embodiment of the invention, the step of evaluating parameters of the sensed presses may comprise reading the stored identifications of a pressed button and the number of consecutively presses from the memory, processing the read identifications of the pressed button and the number of consecutively presses, and changing the color in accordance with the processing result.

As mentioned above, a microcontroller or processor may be applied to implement the embodiments of the inventive method and configured to perform the evaluation. For example, the buttons may be electrically connected to keyboard inputs of a microcontroller and a program stored in an internal ROM (Read Only Memory) of the microcontroller may be configured to sense the keyboard inputs for presses of the connected buttons and to process sensed presses according to the above method steps.

According to a further embodiment of the invention, a computer program is provided, wherein the computer program may be enabled to carry out the method according to the invention when executed by a computer. The computer program allows implementing the invention for example in a Personal Computer (PC) which may be used for controlling a complex lighting system.

According to an embodiment of the invention, a record carrier such as a CD-ROM, DVD, memory card, floppy disk or similar storage medium may be provided for storing a computer program according to the invention.

According to a further embodiment of the invention, a button based color navigation device for a lighting or visualization system comprising several buttons arranged in predetermined order is provided, wherein each of the buttons is provided for a certain color of the system to be selected, wherein the device comprises sensor means for sensing presses of one or more buttons, evaluation means for evaluating parameters of the sensed presses and color change means for initiating a changing of a color in the lighting system depending on the evaluation of the parameters.

Particularly, according to an embodiment of the invention, the device may be adapted to perform a method according to the invention. The device may comprise for example a microcontroller with a memory, in which a program implementing the method according to the invention is stored. The microcontroller may comprise a keyboard interface for sensing presses of buttons of the keyboard. The sensed presses of the button may then be evaluated by the program stored in the memory and executed by the processor of the microcontroller. Such a microcontroller may be suitable to be implemented in electronic device for controlling for example complex lighting systems of TV sets.

According to an embodiment of the invention, the device may be a remote control for the lighting or visualization system and may comprise transmitter means for transmitting a color change signal to a receiver of the system, wherein the color change signal is adapted to initiate a color change in the system.

These and other aspects of the invention will be apparent from and elucidated with reference to the embodiment(s) described hereinafter.

The invention will be described in more detail hereinafter with reference to exemplary embodiments. However, the invention is not limited to these exemplary embodiments.

In the following description, the invention is described with regard to the color control of a complex lighting system with several light units. Furthermore, (functional) similar or identical elements in the drawings may be denoted with the same reference numerals in the following description.

Figure 1:
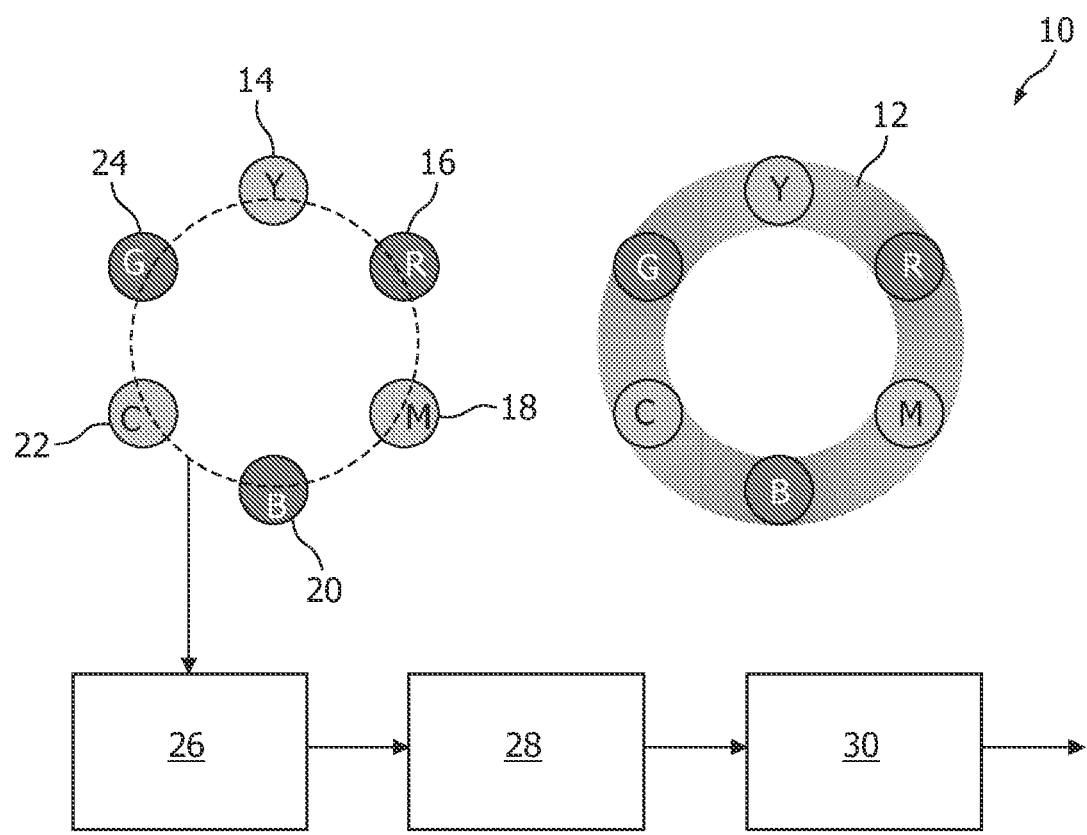
FIG. 1 shows an arrangement of six buttons of a first embodiment of a button based color navigation device for a lighting system according to the invention.

Modern lighting systems allow not only controlling the lighting intensity, but also the lighting color in order to create a pleasant atmosphere. In order to navigate and set colors of a light source, a so-called color navigation device 10 with several buttons arranged in predetermined order may be used. The buttons may be positioned on a kind of color navigation circle 12 defining the predetermined order, as shown in FIG. 1. Each of the six buttons is provided for a certain color of the system to be selected. The button 14 located at 12 o'clock is pre-set with the color yellow, the button 16 located at 2 o'clock is pre-set with the color red, the button 18 located at 4 o'clock is pre-set with the color magenta, the button 20 located at 6 o'clock is pre-set with the color blue, the button 22 located at 8 o'clock is pre-set with the color cyan, and the button 24 located at 10 o'clock is pre-set with the color green. Thus, each of the buttons 14, 16, 18, 20, 22, 24 allows to fast selecting the respective pre-set color. Sensor means 26 are provided for sensing presses of one or more of the buttons. The sensor means 26 may be implemented an integrated circuit for sensing presses on the buttons and storing the sensed presses with an identification of the respective buttons and a kind of time stamp of a press in a memory such as a buffer. Evaluation means 28 receive the memory contents, i.e. the buttons presses stored in the buffer from the sensor means 26 and evaluate parameters of the sensed presses, such as the time span between two consecutive presses and the adjacency of two consecutive pressed buttons with regard to the predetermined order of the buttons. Color change means 30 receive the evaluation result from the evaluation means 28 and initiate a changing of a color in the system depending on the evaluation of the parameters. The means 26, 28, and 30 may be implemented for example as modules of a microcontroller for a remote control, or may be implemented in software and for example stored in a memory of a microcontroller and executed by the processor of the controller. The left part of FIG. 1 shows a six color buttons only navigation device and the right part of FIG. 1 an embodiment with graphics supporting the color wheel function.

Before explaining the navigation through colors, the meaning of adjacency in the context of the present invention is explained in the following. Adjacency and non adjacency means the distance of two consecutively pressed buttons in the order of the buttons. The judgment about adjacency depends on a predetermined adjacency of the order of the buttons. For example, the predetermined adjacency may be set to one button. This means that two consecutively pressed buttons are judged as being adjacent if the distance of these buttons is one button. However if the distance is larger than one button, the two buttons are judged as being non-adjacent. For example, when firstly pressing the yellow button 14 and secondly the magenta button 18, the distance of the consecutively pressed buttons 14 and 18 is two buttons and larger than the predetermined adjacency of one button. However, when the secondly pressed button is the green button 24, the distance of the consecutively pressed buttons 14 and 24 is one button and equals the predetermined adjacency. Depending on the judgment about adjacency, a certain color changing mode—fast or slow change of the color—may be initiated as will be explained in the following.

Figure 2:
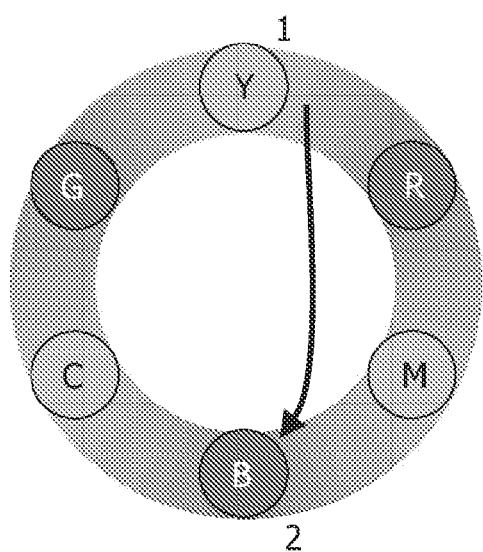
FIG. 2 shows the principle of fast color selection with the device of FIG. 1.

The fast color selection is explained with regard to FIG. 2: pressing a non adjacent button initiates fast color selection. For example, when first the yellow button 14 is pressed, a yellow color is set for a lamp of the lighting system. Secondly, when pressing the blue button 20 which is located non adjacent to the yellow button 14, the lamp immediately jumps to the blue color.

Figure 3:
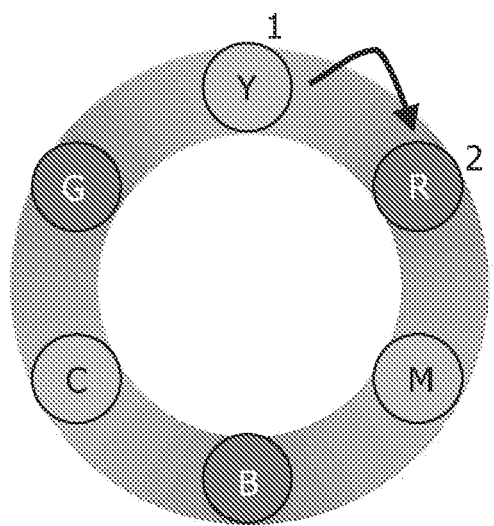
FIG. 3 shows the principle of fine-tuning a color selection (or slow color selection) with the device of FIG. 1.

A slow color change mode for fine-tuning of a selected color may be initiated by pressing an adjacent button, as will be explained now with regard to FIG. 3. For example when first the yellow button 14 is pressed, a yellow color is set for the lamp. Secondly, when pressing the red button 16, the lamp slowly changes the lighting color from yellow to red color. When the red button 14 is released, the color changing stops. In this way for example an orange color can be set. Next, the color can be made more yellowish-orange by pressing the yellow (adjacent to the red button 16) button 14. Or the user can make the color more reddish-orange by pressing the red (same) button 16 again. The color changing automatically stops when the red color is reached.

Figure 4:
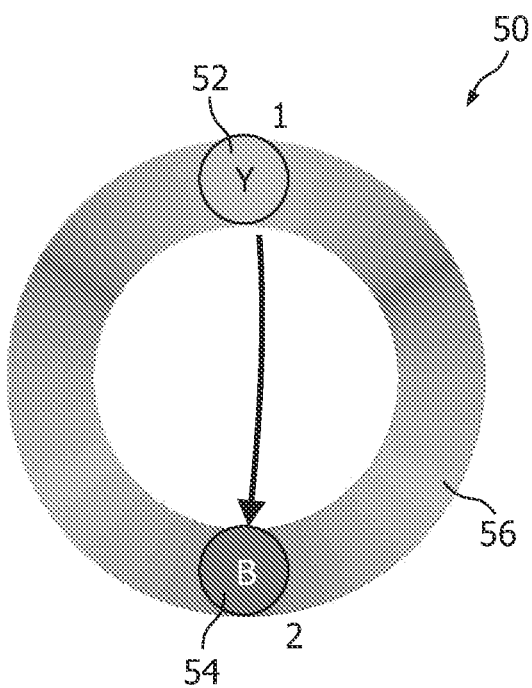
FIGS. 4 and 5 show the principle of fast and slow color selection with a second embodiment of a button based color navigation device for a lighting system according to the invention, which comprises an arrangement of only two buttons.

It should be noted that this embodiment can be applied to four or more buttons. Because for three or less buttons every button is adjacent (the minimum pre-determined adjacency is one button) and fast color selection should be solved in a different way, as will be explained now with regard to FIGS. 4 and 5. For three or less buttons, the initiation of the fast or slow color change mode can be implemented by multiple presses of the same button. For example for two buttons, when pressing the second button twice (fast after each other) a fast color change may be initiated, refer to FIG. 4. FIG. 4 shows a color navigation device 50 with two buttons 52 and 54 positioned on 12 o'clock and 6 o'clock, respectively, of a color circle 56. Button 52 is pre-set to the color yellow, button 54 to the color blue. The device 50 is configured for a fast and slow color changing mode, which are initiated as will be described in the following:

For a fast color change from for example yellow to blue, the second button 54 is pressed twice (fast after each other; shown by the short nearly straight arrow). The presses of the second button 54 are sensed and the time duration between the presses is evaluated as the parameter for judging whether a fast color change should be initiated. If the two presses are evaluated to occur within a predetermined time span, the fast color change mode may be initiated (refer to FIG. 4: the nearly straight arrow from button 52 to button 54 demonstrates a fast color change like a switch from color yellow to color blue); otherwise the color changes slowly via all intermediate colors of the circle or wheel 56 (refer to FIG. 5: the circular arrow from button 52 to button 54 demonstrates a slow color change with a smooth and steady switch from color yellow to color blue). This principle of color navigation may also be used with more than two buttons, for example with the device shown in FIG. 1 alternatively or in addition to the first embodiment as described above in connection with FIGS. 1 to 3.

Figure 6:
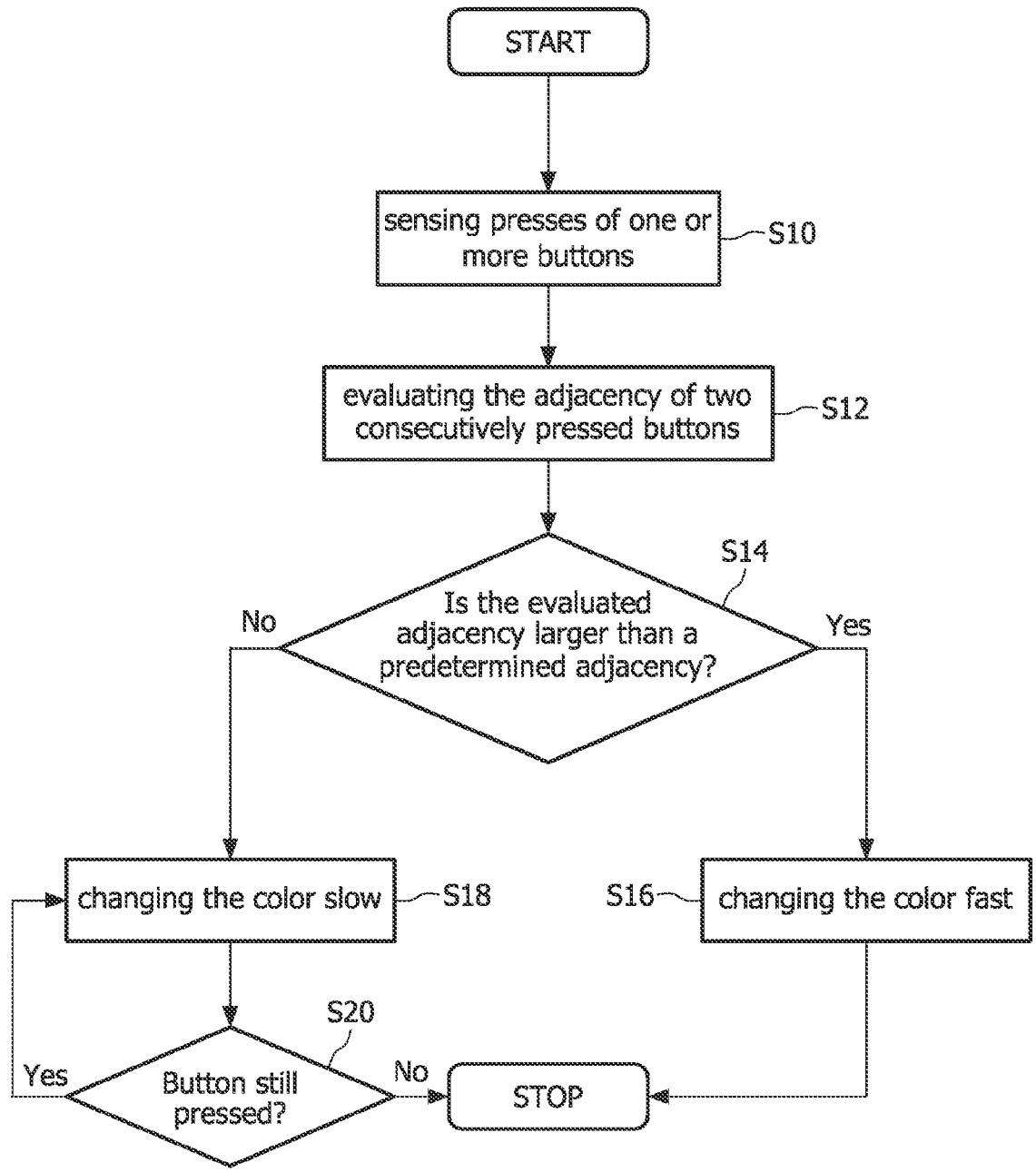
FIG. 6 shows a flowchart of a first embodiment of a method for button based color navigation with a device with four or more buttons according to the invention.

FIG. 6 shows a flowchart of a method for button based color navigation method with a device comprising four or more buttons. In a first step S10, presses of one or more buttons of the device are sensed. In the following step S12, the sensed presses are evaluated in that the adjacency of two consecutively presses buttons is evaluated. In a step S14, it is checked whether the evaluated adjacency is larger than a predetermined adjacency, or not. If the evaluated adjacency is larger, the color in the system is changed fast in step S16. If the evaluated adjacency is not larger, the method switches in the slow color change mode and continues with step S18, in which a slow changing process of the color starts. In a step S20, it is continuously checked whether the last pressed button is still pressed. If the button is still pressed, the slow color change continues. Otherwise, i.e. if the button is released, the slow color change stops and the color at the time of releasing the button is set in the system.

Figure 5:
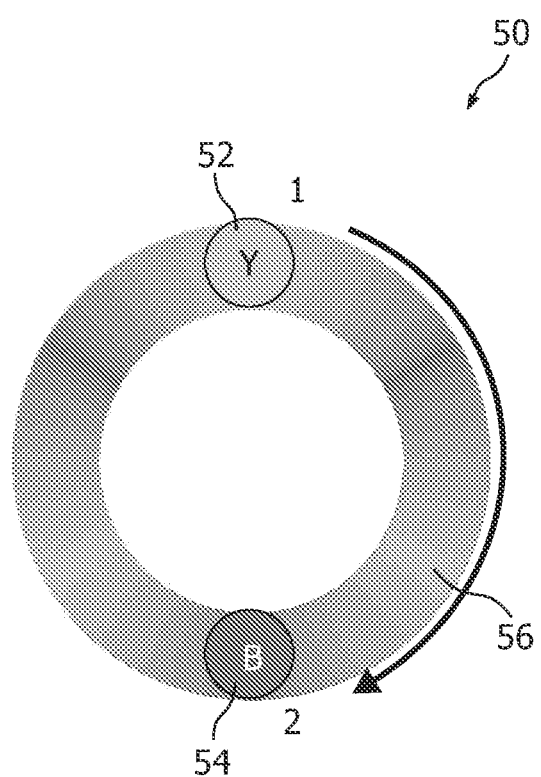
Figure 7:
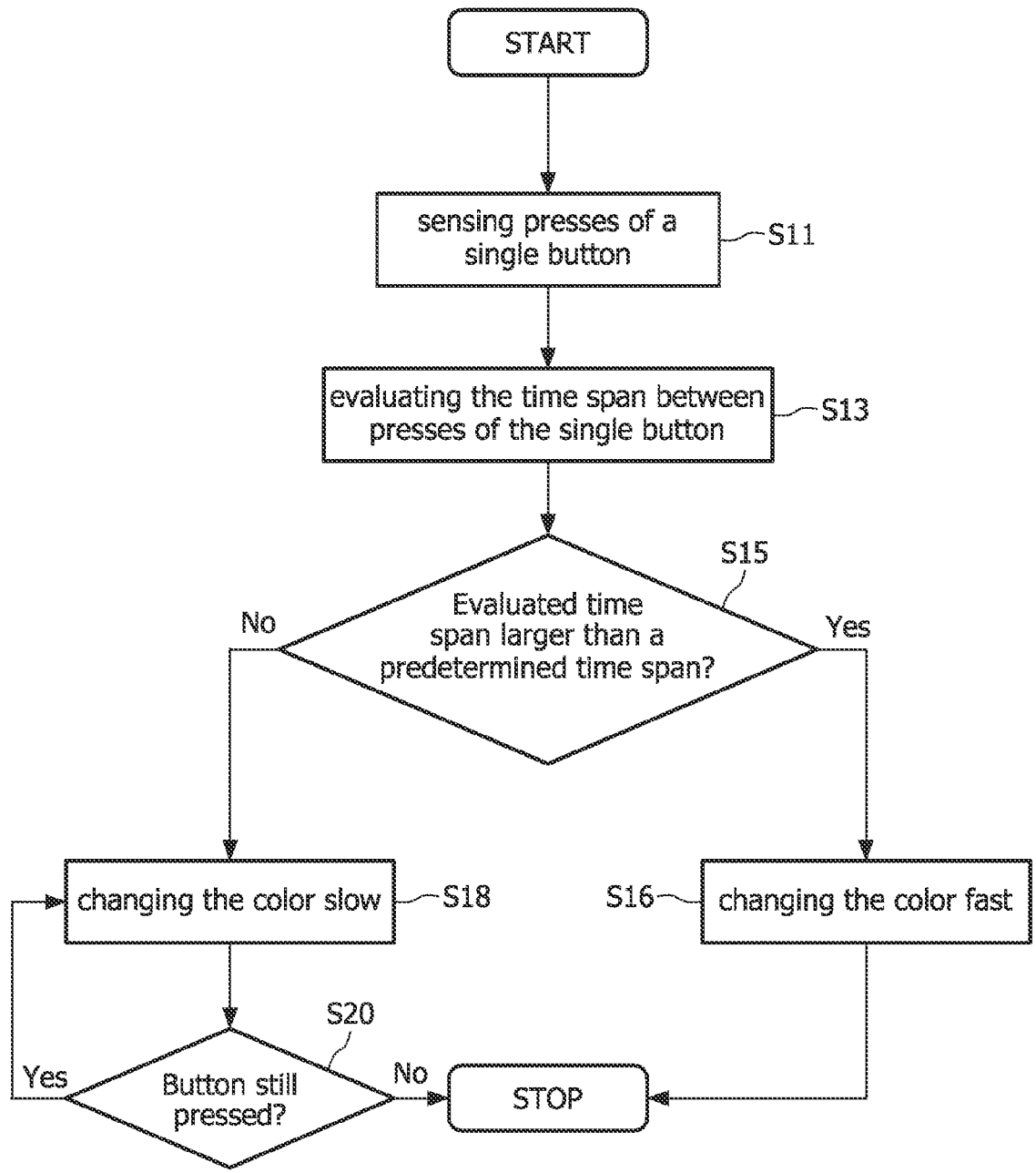
FIG. 7 shows a flowchart of a second embodiment of a method for button based color navigation with a device with two buttons according to the invention.

FIG. 7 shows a flowchart of a method for button based color navigation method with a device comprising only two buttons, as for example shown in FIGS. 4 and 5. In a first step S11, presses of a single button of the two buttons of the device is sensed. In the following step S13, the sensed presses are evaluated in that the time span between two consecutively presses of the single button is evaluated. In a step S15, it is checked whether the evaluated time span is larger than a predetermined time span, or not. If the evaluated time span is larger, the color in the system is changed fast in step S16. If the evaluated time span is not larger, the method switches in the slow color change mode and continues with step S18, in which a slow changing process of the color starts. In step S20, it is continuously checked whether the single button is still pressed. If the buttons is still pressed, the slow color change continues. Otherwise, i.e. if the button is released, the slow color change stops and the color at the time of releasing the button is set in the system.

At least some of the functionality of the invention may be performed by hard- or software, as for example the before described embodiments of the methods as shown in FIGS. 6 and 7. In case of an implementation in software, a single or multiple standard microprocessors or microcontrollers may be used to process a single or multiple algorithms implementing the invention.

It should be noted that the word "comprise" does not exclude other elements or steps, and that the word "a" or "an" does not exclude a plurality. Furthermore, any reference signs in the claims shall not be construed as limiting the scope of the invention.

The invention claimed is:

1. A button based color navigation method in a lighting or visualization system with a device comprising
    a plurality of buttons arranged in predetermined order on a panel,
    wherein each of the buttons is provided for a certain color of the system to be selected, including
    sensing presses of one or more buttons,
    evaluating parameters of the sensed presses and
    changing a color in the system depending on the evaluation of the parameters
    wherein the step of evaluating parameters of the sensed presses includes
    evaluating an adjacency of two consecutively pressed buttons and
    changing the color depending on the evaluated adjacency, wherein adjacency is determined by distance of a position of the two buttons.

2. The method of claim 1., wherein the step of changing the color depending on the evaluated adjacency comprises
    changing the color at a first predetermined speed if the evaluated adjacency is larger than a predetermined adjacency, or
    changing the color at a second predetermined speed less than the first predetermined speed if the evaluated adjacency is smaller than or equals the predetermined adjacency.

3. The method of claim 2, wherein the step of changing the color at the second predetermined speed comprises
    changing the color at the second predetermined speed as long a button is pressed and
    stop changing the color upon release of a button.

4. The method of claim 1, wherein the step of evaluating parameters of the sensed presses comprises
    evaluating the number of presses of a single button and changing the color depending on the evaluated number of presses.

5. The method of claim 4, wherein the step of changing the color depending on the evaluated number of presses comprises
    changing the color at a first predetermined speed if the single button was pressed repeatedly within a predetermined time span or
    changing the color at a second predetermined speed less than the first predetermined speed if the single button was pressed once within the predetermined time span.

6. The method of claim 1, wherein the step of evaluating parameters of the sensed presses comprises
    evaluating the time duration of pressing of a single button and
    changing the color depending on the evaluated time duration.

7. The method of claim 6, wherein the step of changing the color depending on the evaluated time duration comprises
    changing the color at a first predetermined speed if the evaluated time duration is smaller than a predetermined time duration or
    changing the color at a second predetermined speed less than the first predetermined speed if the evaluated time duration is larger than or equals the predetermined time duration.

8. The method claim 1, wherein the step of evaluating parameters of the sensed presses comprises
    evaluating the simultaneous pressing of several buttons and
    changing the color depending on the evaluated simultaneous pressing.

9. The method of claim 8, wherein the step of changing the color depending on the evaluated simultaneous pressing comprises
    changing the color at a first predetermined speed if two or more buttons were pressed at the same time or
    changing the color at a second predetermined speed greater than the first predetermined speed if only one button was pressed.

10. The method of claim 1, wherein the step of sensing presses comprises
    storing an identification of a pressed button and the number of consecutively presses of the button within a predetermined time span in a memory.

11. the method of claim 10 wherein the step of evaluation parameters of the sensed presses comprises
    reading the stored identifications of a pressed button and the number of consecutively presses from the memory,
    processing the read identifications of the pressed button and the number of consecutively presses, and
    changing the color in accordance with the processing result.

12. A button based color navigation device for a lighting or visualization system comprising
    a plurality of buttons arranged in predetermined order,
    wherein each of the buttons is provided for a certain color of the system to be selected, including
    sensor means for sensing presses of one or more buttons,
    evaluation means for evaluating parameters of the sensed presses and
    color change means for initiating a changing of a color in the system depending on the evaluation of the parameters,
    wherein the evaluating means includes
    evaluating the circular or angle between two consecutively pressed buttons.

13. A remote control device for a lighting or visualization system comprising several buttons arranged in predetermined order, wherein each of the buttons is provided for a certain color of the system to be selected, comprising
- sensor means for sensing presses of one or more buttons,
- evaluation means for evaluating parameters of the sensed presses,
- color change means for initiating a changing of a color in the system depending on the evaluation of the parameters,
- transmitter means for transmitting a color change signal to initiate a color change in the system,
- wherein the evaluating means includes
- evaluating the circular or angle between two consecutively pressed buttons.

* * * * *